US007166851B2

(12) United States Patent
Sharma

(10) Patent No.: US 7,166,851 B2
(45) Date of Patent: Jan. 23, 2007

(54) SEMICONDUCTOR CHIP-BASED RADIATION DETECTOR

(75) Inventor: Suresh C. Sharma, Arlington, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 216 days.

(21) Appl. No.: 10/392,397

(22) Filed: Mar. 19, 2003

(65) Prior Publication Data

US 2003/0218138 A1    Nov. 27, 2003

Related U.S. Application Data

(63) Continuation-in-part of application No. 10/028,353, filed on Dec. 21, 2001, now Pat. No. 6,683,309.

(60) Provisional application No. 60/258,720, filed on Dec. 29, 2000.

(51) Int. Cl.
*G01T 1/06* (2006.01)
(52) U.S. Cl. .................................. 250/474.1
(58) Field of Classification Search ............ 250/474.1, 250/372; 257/72, 79, 40; 349/166, 86; 359/449, 359/443; 428/1.1; 345/172, 184
See application file for complete search history.

(56) References Cited

U.S. PATENT DOCUMENTS

| 4,595,292 | A | | 6/1986 | Amodeo et al. |
| 5,124,635 | A | * | 6/1992 | Henley .................. 324/96 |
| 5,359,075 | A | | 10/1994 | Ohyama et al. |
| 5,585,035 | A | * | 12/1996 | Nerad et al. ............ 252/299.01 |
| 5,698,343 | A | | 12/1997 | Sutherland et al. |
| 5,867,238 | A | | 2/1999 | Miller et al. |
| 5,977,955 | A | * | 11/1999 | Jaeger ...................... 345/172 |
| 6,061,107 | A | | 5/2000 | Yang et al. |
| 6,396,045 | B1 | * | 5/2002 | Ballingall et al. ....... 250/208.1 |
| 6,414,294 | B1 | * | 7/2002 | Marshall et al. ......... 250/208.1 |
| 6,426,503 | B1 | * | 7/2002 | Wuest ....................... 250/372 |
| 6,538,814 | B1 | * | 3/2003 | Hunter et al. ............. 359/449 |
| 6,665,042 | B1 | * | 12/2003 | Marshall et al. .......... 349/166 |
| 6,671,008 | B1 | * | 12/2003 | Li et al. ...................... 349/16 |
| 6,677,613 | B1 | * | 1/2004 | Yamazaki et al. .......... 257/72 |
| 6,815,016 | B1 | * | 11/2004 | Kyu et al. .................. 428/1.1 |
| 6,888,141 | B1 | * | 5/2005 | Carr ........................ 250/338.1 |

FOREIGN PATENT DOCUMENTS

WO    WO 01/22505 A1    3/2001

OTHER PUBLICATIONS

P. Mormile, P. Musto, L. Petti, G. Ragosta, and P. Villano, Electro-optical properties of a PDLC based on unsaturated polyester resin, Appl. Phys. B, 2000, 249-252, 70, Italy.
S. A. Carter, J. D. Legrange, W. White, J Boo, and P. Wiltzius, Dependence of the morphology of polymer dispersed liquid crystals on the UV polymerization process, Appl. Phys., 1997, 5992, 81(9), Murray Hill, NJ.

(Continued)

*Primary Examiner*—Otilia Gabor
(74) *Attorney, Agent, or Firm*—Gardere Wynne Sewell LLP

(57) ABSTRACT

The present invention is a self-contained device for measuring exposure to radiation which includes an integrated circuit device incorporating a polymer dispersed liquid crystal component that resides on a semiconductor substrate.

30 Claims, 8 Drawing Sheets

OTHER PUBLICATIONS

D. Cupelli, M. Macchione, F.P. Nicoletta, G. De Filpo, and G. Chidichimo, Electrically induced changes in polymer dispersed liquid crystals, Appl. Phys. Lett., 1998, 2856-2858, 76(20), Italy.

J.L. West, J.R. Kelly, K. Jewell, and Y. Li, Effect of polymer matrix glass transition temperature on polymer dispersed liquid crystal electro-optics, Appl. Phys. Lett, 1992, 3238-3240, 60(26), Kent, Ohio.

Karl Amundson, Alfons Van Blaaderen, and Pierre Wirtzius, Morphology and electro-optic properties of polymer-dispersed liquid-crystal films, Phys. Rev. E, 1997, 1646, (55)2, Murray Hill, NJ.

R. Barotlino, N. Scaramuzza, D.E. Lucchetta, E. S. Bama, A. Th. Ionescu, and L. M. Blinov, Polarity sensitive electro optical response in a nematic liquid crystal-polymer mixture, J. Appl. Phys, 1999, 2870, 85(5), Italy.

P. Mormile, L. Petti, M. Abbate, P. Musto, G. Ragosta, and P. Villano, Temperature switch and thermally induced optical bistability in a PDLC, Optics Communications, 1998, 269, 147, Italy.

S.C. Sharma, L. Zhang, A.J. Tapiawala, and P.C. Jain, Evidence for Droplet Reorientation and Interfacial Charges in a Polymer-Dispersed Liquid-Cell, Phys. Rev. Lett, 2001, 105501-1, 87(10), Arlington, TX.

H. K Jeong, Hirotsugu Kikuchi and Tisato Kajiyama, Kinetic Control of the phase-separated structure and electro-optical switching properties of (polymer/liquid crystal) composite films prepared by a solvent case method, New Polymeric Materials, 1998, 103-117, 5(2), Japan.

S.C. Jain and D. K. Rout, Electro-optic response of polymer dispersed liquid-crystal films, J. Appl. Phys., 1991, 6988-6992, 70(11), India.

Si-Xue Cheng, Ru-Ke Bai, Ying-Fang Zou, Cai-Yuan Pan, Electro-optical properties of polymer dispersed liquid crystal materials, J. Appl. Phys. 1996, 80(4), People's Republic of China.

B.G. Wu, J.L. West, and J.W. Doane, Angular discrimination of light transmission through polymer-dispersed liquid-crystal films, J. Appl. Phys., 1987, 3925, 62, Kent, Ohio.

P.S. Drzaic and A.M. Gonzales, Refractive index gradients and light scattering in polymer-dispersed liquid crystal films, Appl. Phys. Lett., 1993, 1332, 62, Menlo Park, CA.

Kwansum Park, Hirotsugu Kikuchi, Tisato Kajiyama, Component Dependence of Aggregation Structure and Light Scattering Properties of Polymer/Liquid Crystal Composite Films, Polymer Journal, 1994, vol. 26, No. 8, 895-904, Japan.

Paul S. Drzaic, Reorientation dynamics of polymer dispersed nematic liquid crystal films, Liquid Crystals, 1988, vol. 3, No. 11, 1543-1559, Sunnyvale, CA.

S.C. Jain, D.K. Rout and S. Chandra, Electro-Optic Studies on Polymer Dispersed Liquid Crystal Films Prepared by Solvent-Induced Phase Separation Technique, Mol. Cryst. Liq. Cryst., 1990, vol. 188, 251-259, India.

Hwan-Kyeong Jeong, Hirotsugu Kikuchi, Tisato Kajiyama, Low Voltage Switching of Hybrid-Type Cell Composed of (Polymer/Liquid Crystal) Composite System, Polymer Journal, 1997, 165-170, vol. 29, No. 2, Japan.

L. Petti, P. Mormile, W.J. Blau, Fast electro-optical switching and high contrast ratio in epoxy-based polymer dispersed liquid crystals, Optics and Lasers in Engineering, 39, 2003, 369, 377, Ireland.

Tisato Kajiyama, Osamu Yonekura, Jun-Ichiro Nishiwaki and Hirotsugu Kikuchi, Interfacial Interaction of Polymer/Liquid Crystal Molecules and Electrooptical Properties of Their Composite Systems, J.M.S. Pure Appl. Chem., A31(11), pp. 1847-1865 (1994), Hong Kong.

N.N. Peschanskaya, A.S. Smolyanskii, and V. Yu. Surovova, Deformation of polymethylmethacrylate after exposure to $^{60}CO$ Rays, Physics of the Solid State, vol. 35, No. 9, Sep. 1993, Russia.

Hirotsugu Kikuchi, Jun-Ichiro Nishiwaki and Tisato Kajiyama, Mechanism of Electro-Optical Switching Hysteresis for (Polymer/Liquid Crystal Composite Films, Polymer Journal, vol. 27, No. 12, 1246-1256, 1995, Japan.

Jin-Baek Kim, Myong-Goo Lee, Jae-Hak Choi, Effect of the ionic conductivity of a polymer matrix on the electrooptical properties of polymer-dispersed liquid crystal films, Polymer Bulletin 41, 37-43, 1998, Korea.

Jin-Baek Kim, Myong-Goo Lee, Jae-Hak Choi, Polymer-dispersed liquid crystal films using poly (2-methyloxycarbonyl-bicyclo[2.2.1]hepta-2,5-diene-co-poly(ethylene glycol) methacrylate) as a matrix resin, Polymer Bulletin, 41, 701-705, 1998, Korea.

Toru Fujisawa, Masanao Hayasi, Hidetoshi Nakada, Yuitiro Tani and Masao Aizawa, An Analysis of Photo-Polymerization Induced Phase Separation Process in Liquid Crystal/Polymer Composite Films, Mol. Cryst. and Liq,. Cryst. 2001, vol. 366, pp. 107, Japan.

* cited by examiner

Sample A

Sample B

SEMICONDUCTOR CHIP-BASED RADIATION DETECTOR

RELATED U.S. APPLICATION DATA

This application is a Continuation-in-Part of application Ser. No. 10/028,353 that was filed, on Dec. 21, 2001 and which claims priority to U.S. Provisional Ser. No. 60/258,720 that was filed on Dec. 29, 2000. U.S. application Ser. Nos. 10/028,353 and 60/258,720 are incorporated by reference.

BACKGROUND OF THE INVENTION

Polymer dispersed liquid crystal (PDLC) cells are composite materials composed of micron-sized droplets of nematic liquid crystals (LC) that are embedded in a polymer matrix and formed between two indium-tin oxide (ITO) glass plates. The electro-optical properties of PDLC cells are affected by the inherent properties of the LC such as dielectric anisotropy, viscosity, shape, size, and structure of the LC domains. The PDLC cells have optical anisotropy properties dependent on the LC director orientation inside the domain. In the absence of an external field the director orientation for each domain is random with respect to the neighboring domains. This random orientation is such that incoming light into the cell is scattered, and the PDLC appears opaque. By matching the ordinary refractive index of the LC domains and that of the matrix, it is possible to induce an optical transmissive state with an applied external field. This well known electro-optical effect in PDLC is the fundamental basis for many applications of these materials. One of the more interesting characteristics of PDLC cells is the effect of the applied electric field induced on the LC domain and the magnitude of director alignment given the applied field. The dielectric properties of the LC and polymer matrix make the effective electric field seen by the domains different from the externally applied field. When an external field is applied, a change occurs in the molecular configuration in the LC domain, orientation of the domains symmetry axis, and alignment of the director in the droplet. For positive dielectric anisotropy, the LC molecules and the domain's symmetry tend to align along the field, and optical transmission through the PDLC increases.

Recent studies have shown that the effective field seen by the LC domains can change due to accumulation of charges at the LC-matrix interface. There is evidence of radiation-induced charge effects on LC director orientation and electro-optical characteristics of the PDLC cells. By directly observing the PDLC cells optical transmission response to low frequency pulses we obtained a quasi-static DC field response of the PDLC. The results show induced charge effects on the PDLC cells maximum optical transmission for a given applied electric field. In other words, the ability of a PDLC to transmit light is effected by exposure to radiation. This property may be exploited to function as a radiation detector.

Radiation detection is important in many contexts including employee protection, e.g., X-ray technicians and first-responders to emergency situations; and general security, e.g., baggage and freight screening. In many applications it is desirable to have a small self-contained device to monitor exposure. Traditional examples of such devices are film badges. These suffer from the disadvantage of having to be collected and developed before the level of exposure can be established. There exists a need for a self contained device, and a method of preparing such a device, that can be worn or placed in a convenient location, and that provides a temporal report of exposure to a predetermined level of radiation.

SUMMARY OF THE INVENTION

Generally, and in one form, the present invention is self-contained device for measuring exposure to radiation comprising an integrated circuit device incorporating a polymer dispersed liquid crystal component that resides on a semiconductor substrate.

Another embodiment of the present invention is a method for making a self-contained device for measuring exposure to radiation that includes the steps of contacting a light source for producing a light output with a semiconductor substrate as well as contacting a splitting device, for separating the light output into at least two split portions, with a semiconductor substrate. Additionally a polymer dispersed liquid crystal (PDLC) component is contacted with a semiconductor substrate. The PDLC is illuminated by at least one of the split light output portions and is contacted with a device for generating an electrical field within the dispersed liquid crystal component. The device for generating the electric field within the PDLC is also contacted with a semiconductor substrate. A first detector, to detect the intensity of the light output portion that passes through the polymer dispersed liquid crystal component, is also contacted with a semiconductor substrate along with a second detector, to detect the intensity of at least one light component that did not illuminate the polymer dispersed liquid crystal component. A logic device, for comparing the intensities detected by the first and second detectors, and determining if a warning signal should be generated, and a device for generating a warning signal, if the logic device determines a warning signal should be generated are also contacted with the semiconductor substrate.

BRIEF DESCRIPTION OF THE FIGURES

For a complete understanding of the features and advantages of the present invention, reference is now made to the detailed description of the invention along with the accompanying drawings in which.

DETAILED DESCRIPTION

Figure 1:
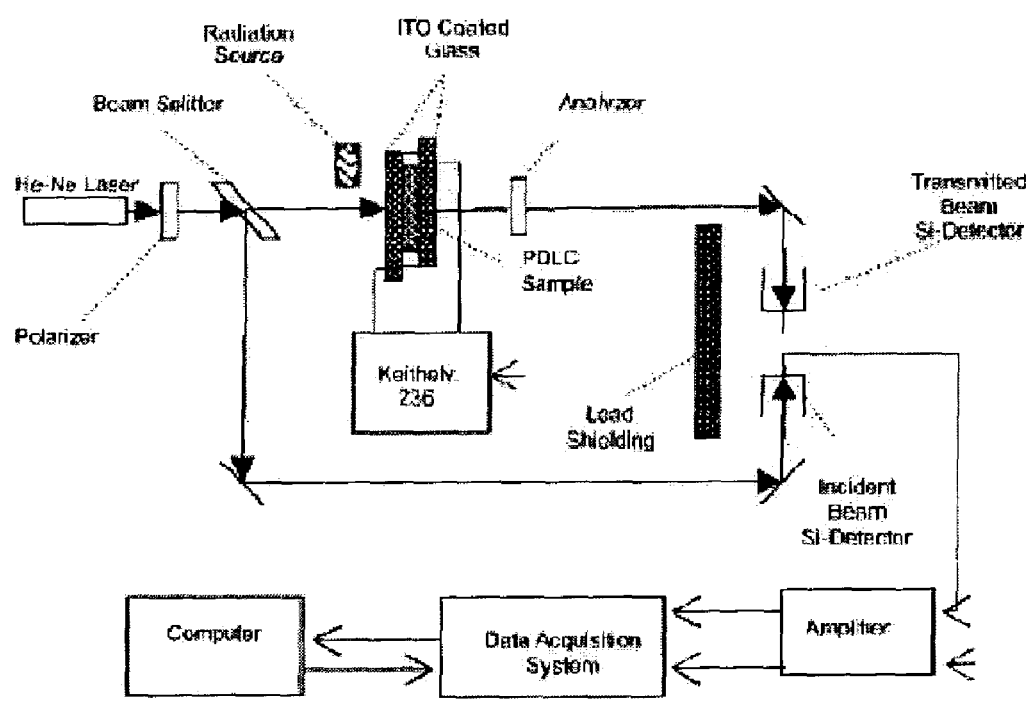
FIG. 1 depicts a schematic of a device for the measurement of transmission of light through PDLC's in accordance with the present invetnion.

While making and using various embodiments of the present invention are discussed herein in terms of polymer dispersed liquid crystal radiation detectors, it should be appreciated that the present invention provides many applicable inventive concepts that can be embodied in a wide variety of specific contexts. The specific embodiments discussed herein are merely illustrative of specific ways to make and use the invention, and do not limit the scope of the invention.

EXAMPLES

PDLC cells were prepared by using a thermally-cured mixture of E300 liquid crystal (BDH Chemicals) in epoxy resin between two ITO coated glass plates. The cell thickness was controlled by the largest diameter, 15 μm, spherical spacers. G400 Zeeospheres (3M Corp.), which had a maximum sphere size of 15 μm, as determined by optical microscopy using calibration techniques described below. The Zeeosphere spacers dispersed easily with mixing into the resin component of the epoxy system. The spacers were mixed, at 75% of the total mass, into the E300-epoxy mixture prior to curing. The mixture was cured between the ITO-glass plates for 20 minutes at 150° C. to form the PDLC cell. The resulting PDLC cell appeared translucent, scattering about 15% of the incident light. Optical microscopy was used to determine the distribution of shapes and sizes of the LC domains in the cell.

A two-component optical epoxy (Epotek 301-2FL) was used as the matrix polymer for the PDLC. The fully cured epoxy has a refractive index of $\eta=1.54$ which is within 0.02 of the ordinary refractive index for E300, $\eta_o=1.52$. The epoxy was allowed to cure at 22° C. for 14 hours prior to mixing with the E300 a step necessary to all LC domains to form during the final curing step. We mixed the epoxy with the E300 at a mass ratio of one part E300 to one part epoxy. The two ITO-glass plates pressed one drop of E300-epoxy mixture between them to form the PDLC cell.

Thermal curing temperature and cooling rates were controlled by a resistively-heated, water cooled aluminum block during the curing cycle. The E300-epoxy mixture cured while compressed by a 15 gram metal plate and held at a constant temperature of 150° C. The PDLC rapidly cooled to allow small droplets of E300 to form. The water-cooled block lowered the PDLC temperature from curing temperature of 150° C. to 40° C. in two stages. The first cooling stage lowered the temperature from 150° C. to 100° C. at a rate of 2° C. per second, and the second stage from 100° C. to 40° C. at a rate of 0.1° C. per second. The cured E300-epoxy mixture was much softer than the cured epoxy alone, presumably due to plasticizing effect of E300 dissolved in the cured mixture.

Optical micrographs provided the domain size distribution data for the two samples, 08152002-1 (Sample A) and 08152002-2 (Sample B). Multiple micrographs were recorded at 200× using a Nikon Optiphot microscope and a Polaroid CCD camera having a 1200×1600 pixel resolution. A ruled microscale (Spencer Lens), ruled with 200 lines per 2 mm, provided a calibration for the micrographs. A total of 4000 droplets in micrographs from Sample A and 7300 droplets in micrographs from Sample B provided the data summarized in the histograms below.

The light transmission properties of the PDLC samples were measured using the experimental setup shown in FIG. 1. A 0.8 mW helium-neon laser was used as the light source for the experiment. Using a 50—50 plate beam splitter the light path was split into two optical paths producing an incident beam and a transmitted beam. A sample holder provided for electrical contact to the ITO glass surface without inducing torsional stress on the sample. A fixed polarizer was placed in front of the sample holder to allow for linear polarization of the beam. An adjustable polarizer (analyzer) was placed behind the sample holder which allowed for parallel or crossed polarized setup. Incident light and transmitted light intensities were measured simultaneously using blue-enhanced Si photodiodes operating in photovoltaic mode. A set of low noise operational amplifier circuits using an Analog Devices AD822 amplified the photocurrent. The amplifier output was then connected to the data acquisition system. Three acquisition channels simultaneously recorded incident light, transmitted light, and triggered the Keithley 236 Source Measure Unit pulse generator. The pulse generator was synchronized with the electro-optical pulse and PDLC cell response measurements. Data analysis utilized standard techniques and practices.

Proper shielding precautions of the Si detectors were taken with the use of 4" lead bricks during the gamma-ray irradiation. Irradiation of the PDLC's was with gamma rays using a 5 μ-$Ci^{207}$ Bi radioactive source. This radioisotope produces gamma rays of energies 0.57 and 1.06 $MeV^5$. It is important to note that the dose used in the present experiment was estimated to be $\leq 10$ mGy which is orders of magnitude lower than critical doses, 100–150 Kgy, for which structural modifications can occur in the polymer matrix.

Figure 2:
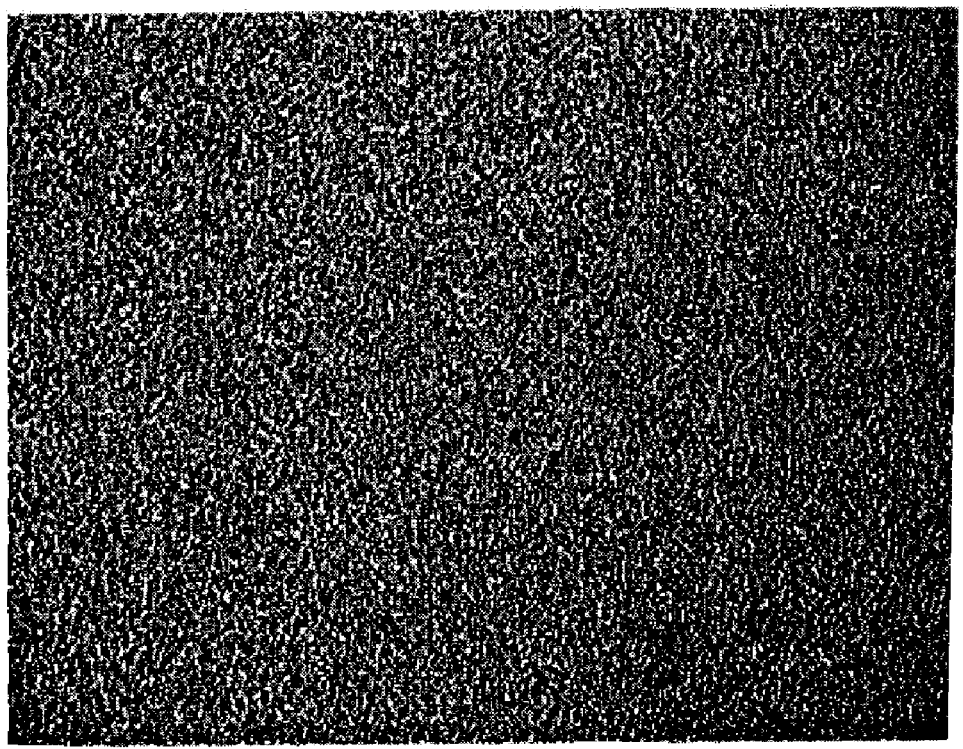
FIGS. 2A & B are micrographs of PDLC's demonstrating the difference in orientation of the crystals under different conditions.
Figure 2:
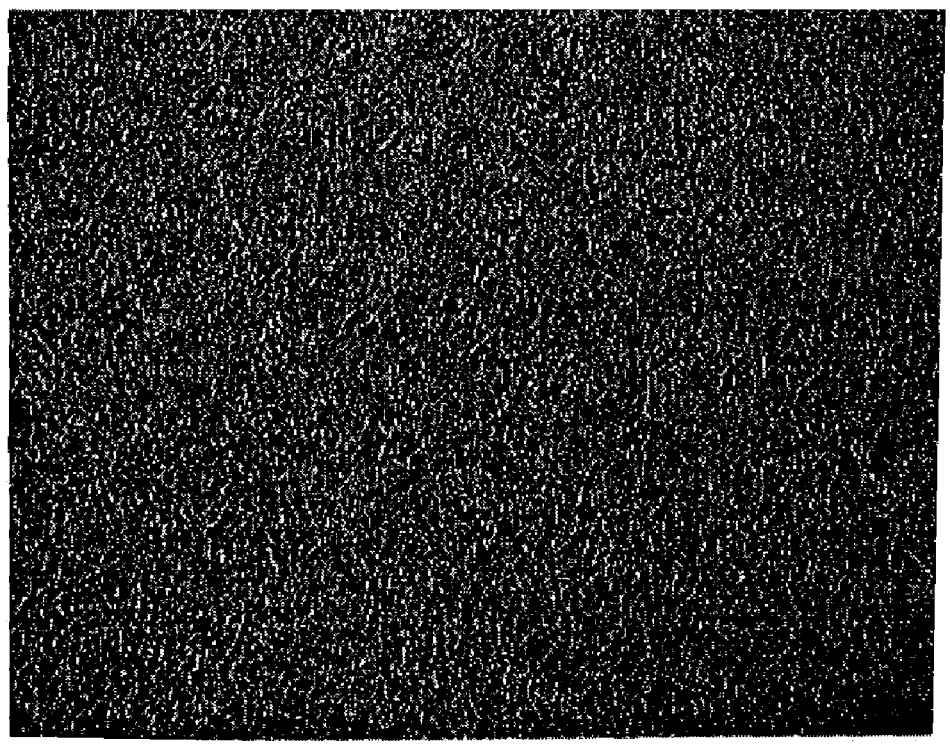
Figure 3:
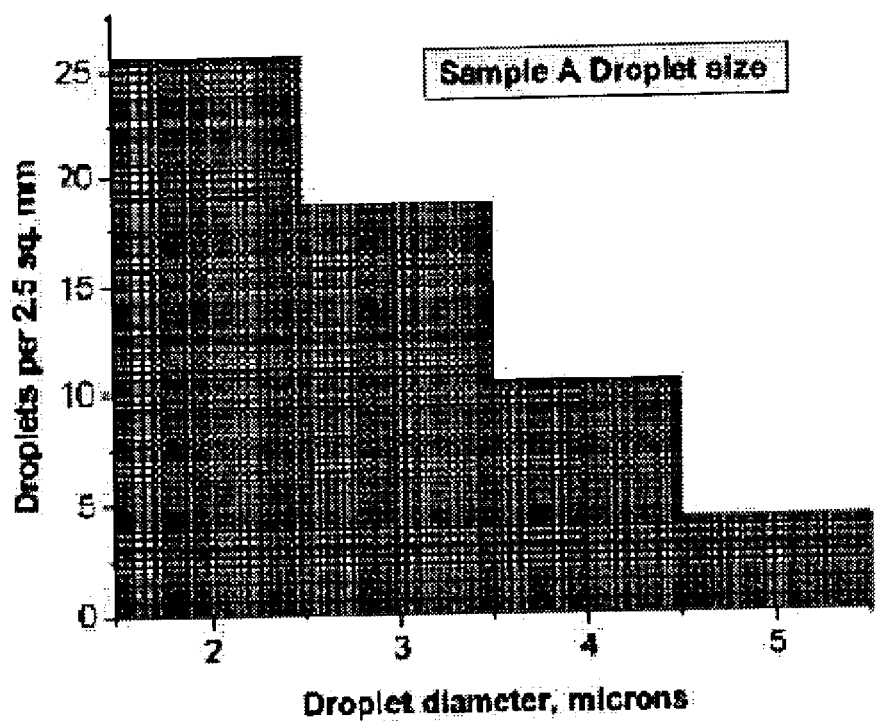
FIG. 3 depicts the LC domain sizes distributions for the two PDLC cells depicted in FIG. 2.
Figure 3:
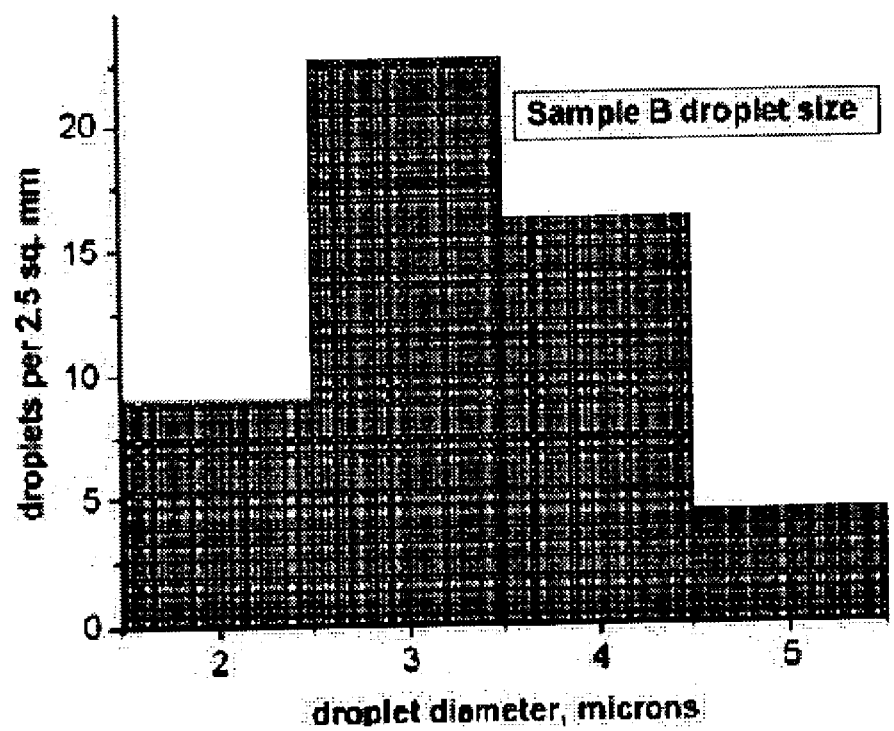

FIG. 2 shows micrographs of PDLC cells, Sample A and Sample B. The spherical shape of the LC domains in Sample A are apparent as dark circles having light centers. The long, high aspect ratio structures, apparent in Sample B resemble needle-shaped solid crystals that formed by recrystallization in some of the epoxy-E300 mixtures. Histograms in FIG. 3 provide the LC domain sizes distributions for the two PDLC cells. The average LC domain sizes, from the histogram, were 2.9 μm±0.9 μm for the Sample A and 3.3 μm±0.9 μm for Sample B. Sample B contained domains of a slightly larger average diameter, while having far fewer 2 μm domains than Sample A. Both the 3 μm and the 4 μm domain counts are larger for Sample B as compared to that for Sample A, which has a larger count in the 2 μm domain size. Note that the 5 μm droplet count is nearly identical for the two samples. The domain count per 2.5 square-mm is much higher for Sample A than for Sample B. This can be observed in the histogram and from inspection of the micrographs. The LC domain densities are 26 LC domains-per-square-mm for Sample A and 20 LC domains-per-square-mm for Sample B.

To characterize the electro-optical properties of the PDLC samples, the threshold voltage at which the optical transmission passes from the off-state to the on-state using a single 0.5 second pulse with increasing field amplitude was determined. The optical region for electro-optical measurements with low cell damage was in the 1.06-to-1.33 MV/m range. A long duration square pulse at high field strength applies a DC field across the material for most of the pulse duration and may cause electrochemical degradation of the organic material, even in the absence of radiation. The long duration pulses were, therefore, not used.

Figure 4:
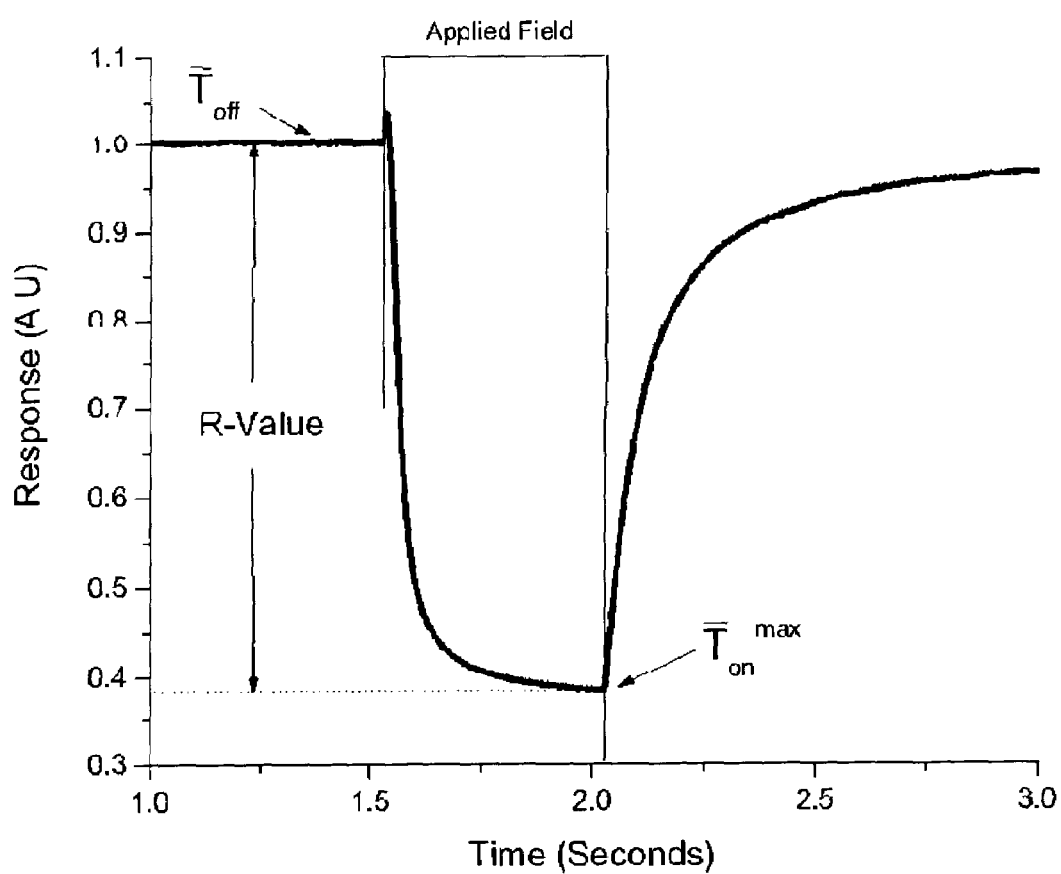
FIG. 4 depicts the response of a PDLC in accordance with the present invention.

Light transmission data through both Sample A and Sample B were measured using crossed-polarization conditions. A 0.5 second 1.2 MV/m square pulse induced a significant effect due to LC director orientation. The resulting optical signal was recorded and is shown in FIG. 4, which shows the time-dependent optical response of the cell. These data represent the time evolution of the LC director orientation along the direction of the applied field. This response was observed to be characteristic of both Sample A and Sample B.

A qualitative description of the physical phenomena causing the electro-optical response in FIG. 4 relies on elliptical polarization of light transmitted through the cell. Application of the 1.2 MV/m pulse decreases the birefringent behavior of the cell as the LC director aligns with the applied field, allowing the linearly polarized light to pass through the sample without induced elliptical polarization. The optical signal then reaches a minimum that in this case is the maximum alignment of the director with the effective field. After removal of the field the director reorients itself back to its lowest potential state, and as seen the reorientation time is much longer than that of the applied field alignment.

Three independent values characterize the pulse response of the PDLC samples, the turn-on (switching) time, the relaxation time, and the R-Value. It is noted that the time-dependent optical response, both rise and decay, of the samples can be numerically fit with single exponential functions and approximate time constants for molecular response and reorientation can be obtained. Defining $T_{off}$ as the time average value over some interval while the applied external field is off, and $T_{on}^{max}$ on as the time average value over some interval while the applied external field is on and the response has reached maximum director alignment, the R-Value, which represents the maximum director orientation due to the effective field across the LC domains, is defined by:

$$R = \frac{\overline{T}_{off} - \overline{T}_{on}^{max}}{\overline{T}_{off}} \quad (1)$$

Figure 5:
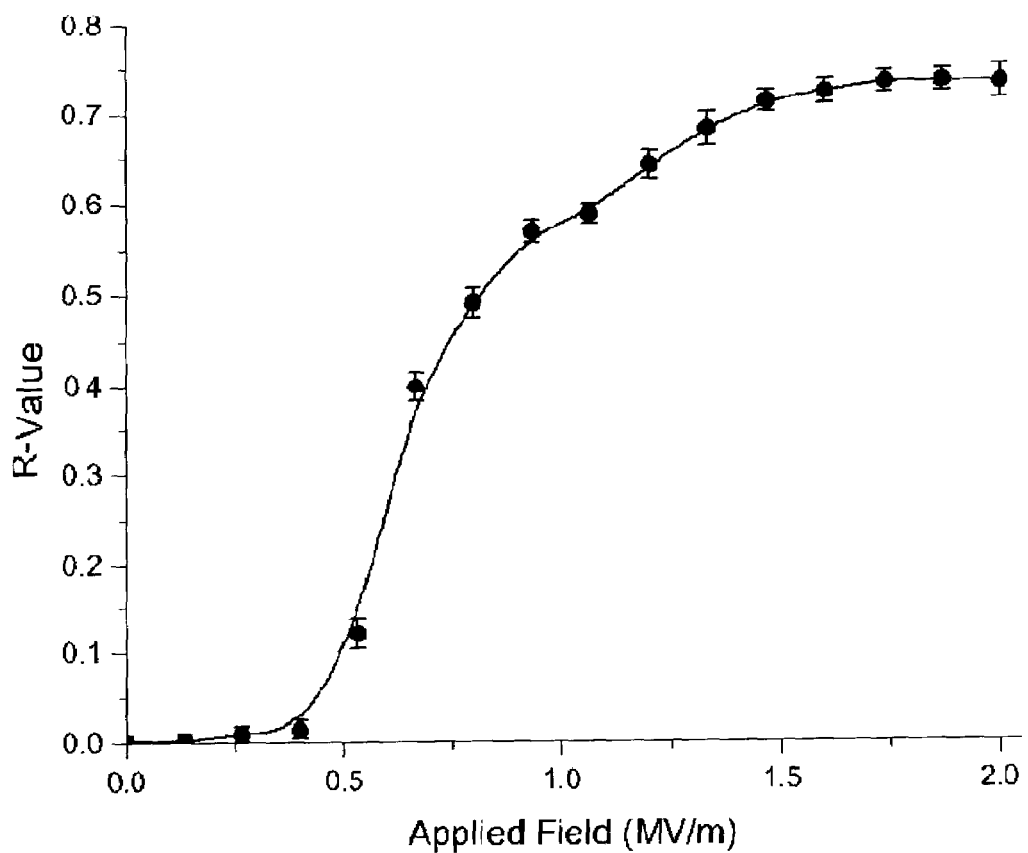
FIG. 5 depicts the R-value of a PDLC in accordance with the present invention as a function of applied field strength.

FIG. 5 shows the dependence of the R-Value on the applied field to the PDLC cell. The degree of field-induced director alignment in the LC domains depends on the inherent properties of PDLC material and strength of the applied field. The magnitude of director alignment increases with an increase in the applied field, as reflected by an increasing R-Value seen in FIG. 5, reaches a maximum and then maintains a constant value.

This is in good agreement with previously published results on optical transmissions of PDLC materials. The R-Values on both Sample A and Sample B increased with applied voltage until they reached a maximum value, at which time the optical transmission and R-Values remained constant.

Exposure of the PDLC to γ-radiation induces interfacial charges in the PDLC. If the applied field is held long enough to allow for diffusion of the charges, the charges may accumulate at the domain-matrix interface. The LC domain surface charge will then distribute itself on the LC-matrix interface, inducing an opposing electric field seen by the LC director and thus reduce the effective field. Therefore a reduction in director alignment will be produced and a lower R-Value should result. Any reduction in the R-Value is due to the additional charges generated in the PDLC cell by γ-radiation exposure.

Figure 6:
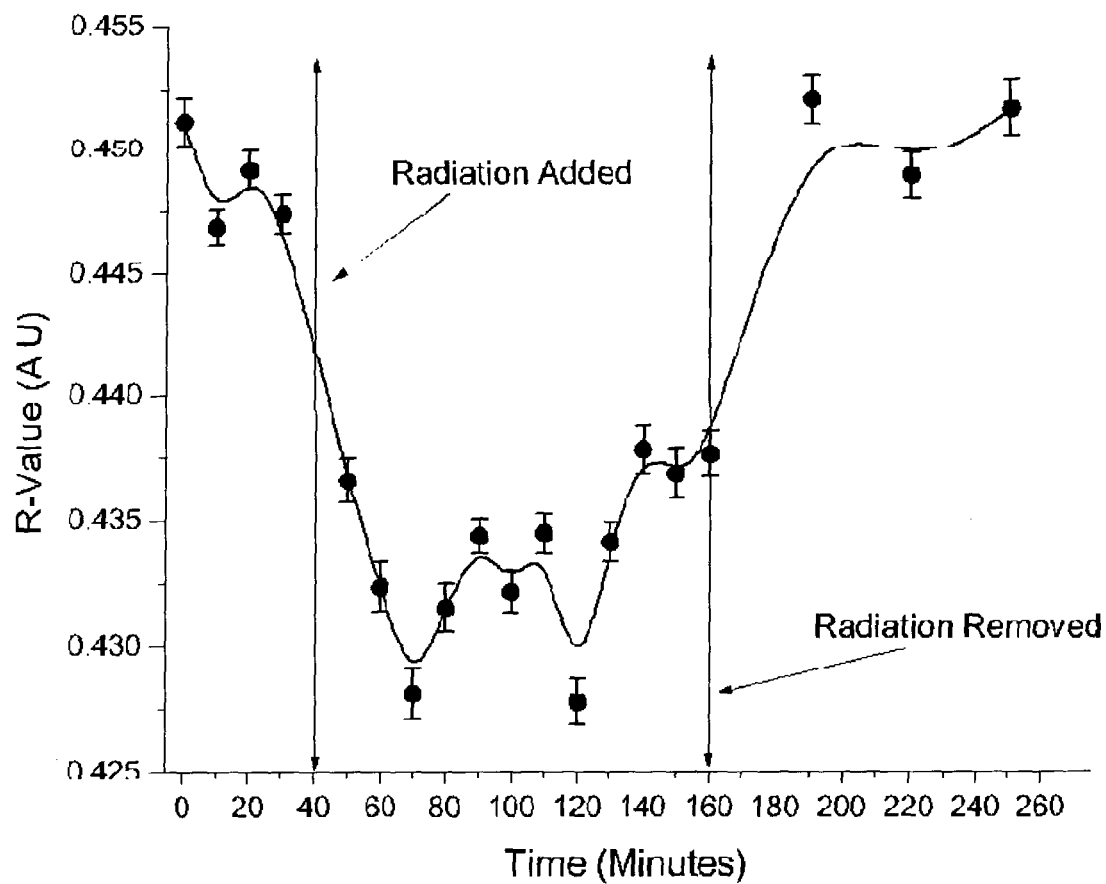
FIG. 6 depicts the behavior of the R value of a PDLC in accordance 3ith the present invention as a function of time.

An extended irradiation period verified that the R-Value decreases with time. FIG. 6, a plot of the R-Value for Sample B as a function of time, displays the γ-radiation effect on the electro-optical response of the PDLC cell. The sample was pulsed at intervals of 10 minutes and the R-Value recorded. Prior to irradiation the R-Value remains time-independent to within standard deviation values. The plot shows the addition and removal of the gamma source at t=40 s and t=160 s respectively. After irradiation for some period a significant reduction in the R-Value for the sample occurs. A saturation value for the R-Value can be seen after only 30 minutes of radiation exposure. The stable R-Value during radiation exposure can be attributed to the equilibrium of the increasing surface charge density of the LC domains. At equilibrium, the opposing electric field seen by the LC domain is maximum and remains constant until removal of the radiation.

Recovery of the cells initial R-Value after removal of the γ-radiation source takes some time. This time is a measure of the rate of surface charge dissipation. Surface charge dissipation may be due to chemical reactions and charge carrier recombination.

Figure 7:
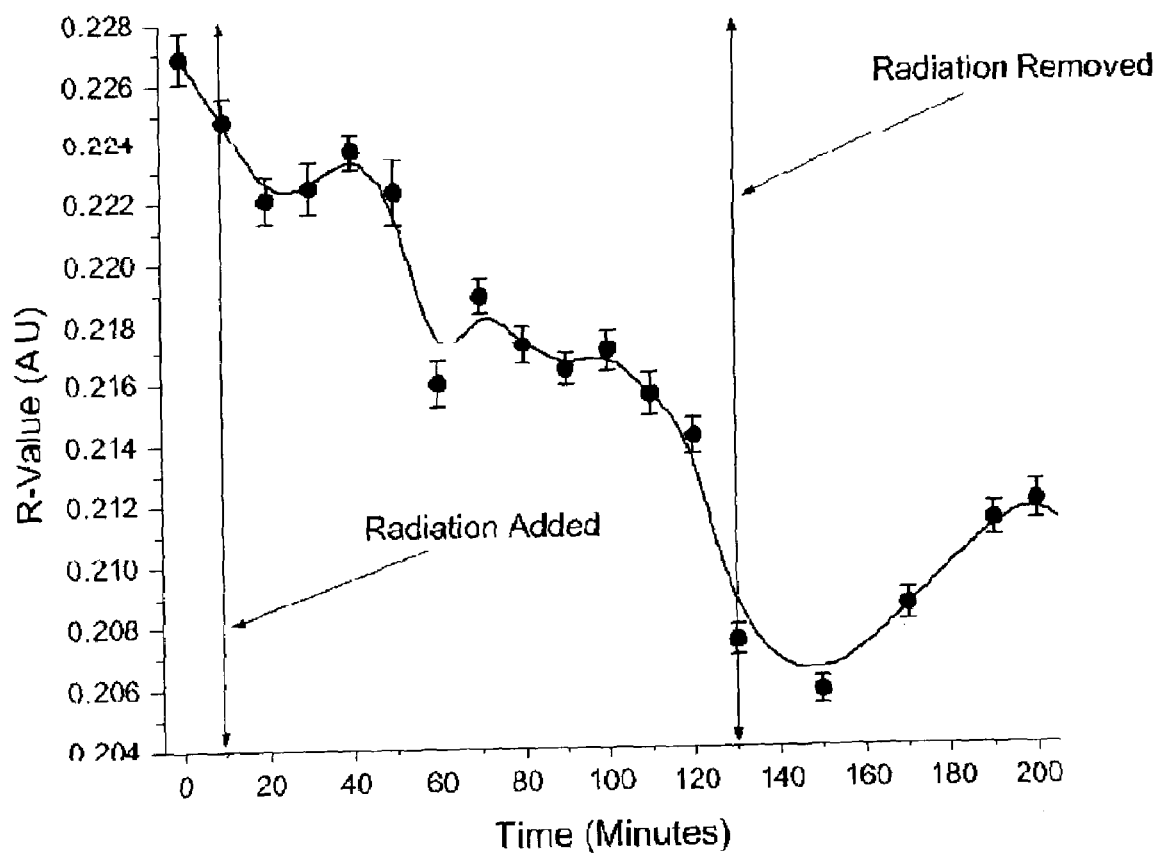
FIG. 7 depicts the behavior of the R value of a PDLC in accordance 3ith the present invention as a function of time.

The larger domain count of Sample A give a larger total LC domain surface area sampled by the 3 mm incident beam spot of the laser. One would expect a longer time period required to reach an equilibrium of the surface charge density due to the larger total surface area. While at the same time one would still expect a decreasing trend in the R-Value. This was indeed observed for Sample A, whose plot is shown in FIG. 7. The sample was pulsed at intervals of 10 minutes and the R-Value recorded. The plot shows the addition and removal of the gamma source at t=10 minutes and t=130 minutes, respectively. In Sample A, an equilibrium of the surface charge density after an extended period of irradiation is not observed. After exposure of 130 minutes the radiation was removed and a slight trend in recovery of the initial R-Value is observed.

The plots of R-Value response of both Sample A and Sample B suggest a dependence of the R-Value response to gamma radiation exposure and that of the LC domain surface area sampled by the beam. As the LC domain density sampled increases the effects of radiation on the R-Value take longer to develop.

Figure 8:
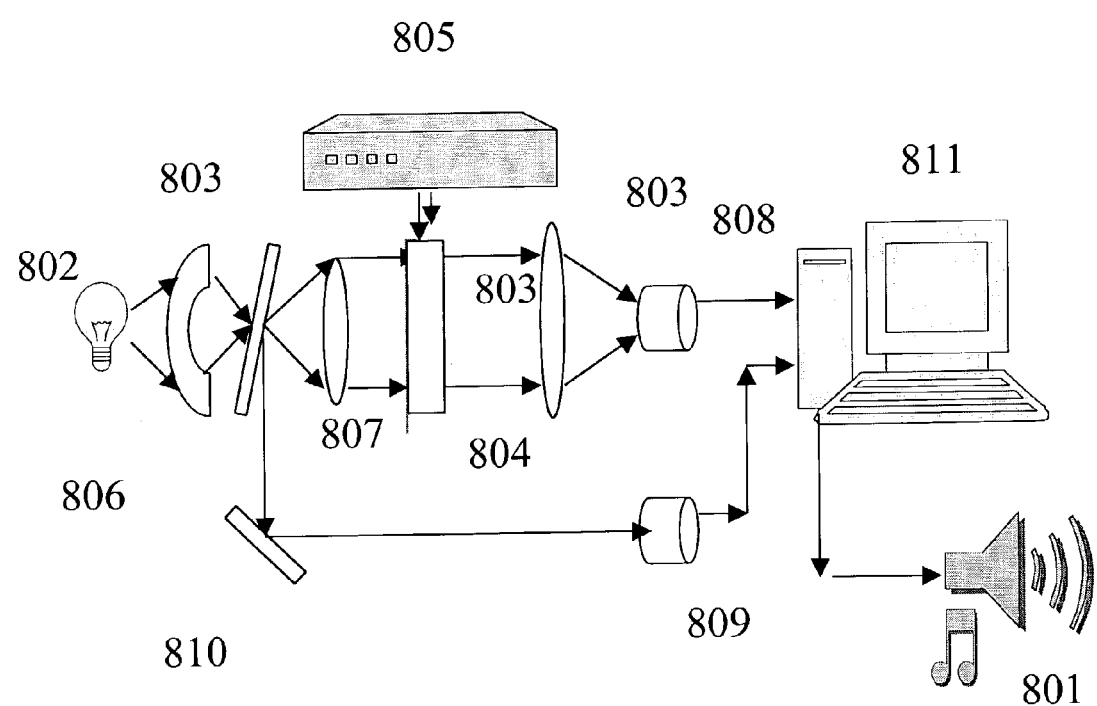
FIG. 8 depicts a schematic of a radiation detector in accordance with the pesent invention.

The observed ability of a PDLC to alter its physical structure in response to exposure to radiation may be exploited to produce a self-contained radiation detector as depicted in FIG. 8. All of the components necessary for the incorporation of a PDLC into a radiation detection device may be fabricated on a semiconductor substrate. The resulting device may, for example, be worn as a badge, or placed in a convenient position to monitor radiation exposure in a passive fashion.

The device may be programmed such that a defined level of exposure is required above a baseline reading before the detector will sound an alarm 801. This alarm may be in any form that informs those in the vicinity of the detector that a radiation exposure level of concern has occurred, for example, the alarm may be in the form of a color change, an audible signal, communication of the warning to remote locations by means of, for example, a phone call, or by a combination of means.

A variety of light sources 802 are available for mounting on a semiconductor substrate. Examples of these include light emitting diodes or semiconductor lasers. Lenses 803 for the focusing of the light produced by the light source may be incorporated into the device itself, or may be external. Similarly, the PDLC component 804 that will respond to the exposure to radiation may be mounted directly upon the semiconductor substrate. It would then be contacted with a solid-state oscillator 805 or other appropriate device that would be capable of generating a steady-state electrical field in the PDLC material 804. This is necessary for the orientation of the liquid crystals within the PDLC.

The light source would be oriented upon the semiconductor substrate in such a manner that there would be an optical device 806 for the splitting of the output from the light source between the lights source and the PDLC. Such a splitter 806 will also produce a reference beam 807 that will not impinge upon the PDLC. Each of the components of the split output of the light source are directed at separate detectors 808 and 809. One detector 808 receives the light transmitted through the PDLC while the other receiver 809 receives the reference beam 807. The reference beam may be redirected with the use of a mirror 810. These detectors are also affixed to the semiconductor substrate. The detectors are connected to a central processor 811 that is also affixed to the semiconductor substrate. The processor is programmed to compare the relative intensity of the split light output to determine if the PDLC has been exposed to radiation. A variety of programming methods may be used to analyze the data. A threshold value may also be programmed to trigger the issuance of a warning, or alarm indication.

Although preferred embodiments of the present invention have been described in detail herein, those skilled in the art will recognize that various substitutions and modifications may be made to the invention without departing from the scope and spirit of the appended claims.

What is claimed is:

1. A self-contained device for measuring exposure to radiation comprising:
    a semiconductor substrate;
    a light source for producing a light output, wherein the light source is mounted on the semiconductor substrate;
    a splitting device for separating the light output into at least two split portions;
    a polymer dispersed liquid crystal component residing on the semiconductor substrate, the polymer dispersed liquid crystal component illuminated by at least one of the split light output portions;
    a device in contact with semiconductor substrate for generating an electrical field within the polymer dispersed liquid crystal component;
    a first detector to detect the intensity of the light output portion that passes through the polymer dispersed liquid crystal component;
    a second detector to detect the intensity of at least one light component that did not illuminate the polymer dispersed liquid crystal component;
    a logic device for comparing the intensities detected by the first and second detectors, and determining if a warning signal should be generated; and
    a device for generating a warning signal if the logic device determines a warning signal should be generated.

2. The device of claim 1, further comprising:
    at least one lens for focusing the light output of the light source.

3. The device of claim 1 further comprising at least one lens to focus the at least one split light portions that illuminates the polymer dispersed liquid crystal component.

4. The device of claim 1, wherein the light source is a light emitting diode.

5. The device of claim 1, wherein the light source is a laser.

6. The device of claim 1, wherein the light source is a semiconductor laser.

7. The device of claim 1, wherein the first detector is a silicon detector.

8. The device of claim 1, wherein the second detector is a silicon detector.

9. The device of claim 1, wherein the logic device is central processing unit capable of being programmed.

10. The device of claim 9, wherein the central processing unit is programmed with a value for an acceptable difference in the intensities detected by the first and second detectors such that if a relative difference is less than the programmed value, no warning signal is generated by the central processing unit.

11. The device of claim 9, wherein the central processing unit is programmed with a value for an acceptable difference in the intensities detected by the first and second detectors such that if a relative difference is greater than the programmed value, a warning signal is generated by the central processing unit.

12. The device of claim 11, wherein the warning signal is at least an audible sound.

13. The device of claim 11, wherein the warning signal is at least a visual indicator.

14. The device of claim 11, wherein the warning signal is at least transmitted over a wireless network to a remote location.

15. The device of claim 11, wherein the warning signal is at least a physical vibration to alert a user.

16. A method for making a self-contained device for measuring exposure to radiation comprising:
    contacting a light source for producing a light output with a semiconductor substrate, wherein the light;
    contacting a splitting device, for separating the light output into at least two split portions, with a semiconductor substrate;
    contacting a polymer dispersed liquid crystal component, illuminated by at least one of the split light output portions, with a semiconductor substrate;
    contacting a device for generating an electrical field within the polymer dispersed liquid crystal component, with a semiconductor substrate;
    contacting a first detector, to detect the intensity of the light output portion that passes through the polymer dispersed liquid crystal component, with a semiconductor substrate;
    contacting a second detector, to detect the intensity of at least one light component that did not illuminate the polymer dispersed liquid crystal component, with a semiconductor substrate;
    contacting a logic device, for comparing the intensities detected by the first and second detectors, and determining if a warning signal should be generated, with a semiconductor substrate; and
    contacting a device for generating a warning signal, if the logic device determines a warning signal should be generated, with a semiconductor substrate.

17. The method of claim 16, further comprising:
    at least one lens for focusing the light output of the light source.

18. The method of claim 16, further comprising at least one lens to focus the at least one split light portions that illuminates the polymer dispersed liquid crystal component.

19. The method of claim 16, wherein the light source is a light emitting diode.

20. The method of claim 16, wherein the light source is a laser.

21. The method of claim 16, wherein the light source is a semiconductor laser.

22. The method of claim 16, wherein the first detector is a silicon detector.

23. The method of claim 16, wherein the second detector is a silicon detector.

24. The method of claim 16, wherein the logic device is central processing unit capable of being programmed.

25. The method of claim 24, wherein the central processing unit is programmed with a value for an acceptable difference in the intensities detected by the first and second detectors such that if a relative difference is less than the programmed value, no warning signal is generated by the central processing unit.

26. The method of claim 24, wherein the central processing unit is programmed with a value for an acceptable difference in the intensities detected by the first and second detectors such that if a relative difference is greater than the programmed value, a warning signal is generated by the central processing unit.

27. The method of claim 26, wherein the warning signal comprises an audible sound.

28. The method of claim 26, wherein the warning signal comprises a visual indicator.

29. The method of claim 26, wherein the warning signal comprises a warning means transmitted over a wireless network to a remote location.

30. The method of claim 26, wherein the warning signal comprises a physical vibration to alert a user.

* * * * *

UNITED STATES PATENT AND TRADEMARK OFFICE
CERTIFICATE OF CORRECTION

| | | |
|---|---|---|
| PATENT NO. | : 7,166,851 B2 | Page 1 of 1 |
| APPLICATION NO. | : 10/392397 | |
| DATED | : January 23, 2007 | |
| INVENTOR(S) | : Suresh Sharma | |

It is certified that error appears in the above-identified patent and that said Letters Patent is hereby corrected as shown below:

In the Specification

At Col. 1, line 12, add

--STATEMENT REGARDING FEDERALLY SPONSORED RESEARCH OR DEVELOPMENT

This invention was made with U.S. Government support under Contract No. INT-9605178 awarded by the National Science Foundation. The government has certain rights in this invention.--

Signed and Sealed this
Twenty-second Day of July, 2014

Michelle K. Lee
*Deputy Director of the United States Patent and Trademark Office*